United States Patent [19]
Neufeld

[11] Patent Number: 5,333,305
[45] Date of Patent: Jul. 26, 1994

[54] METHOD FOR IMPROVING PARTIAL STRIPE WRITE PERFORMANCE IN DISK ARRAY SUBSYSTEMS

[75] Inventor: E. David Neufeld, Tomball, Tex.

[73] Assignee: Compaq Computer Corporation, Houston, Tex.

[21] Appl. No.: 815,118

[22] Filed: Dec. 27, 1991

[51] Int. Cl.⁵ ............................................. G06F 11/10
[52] U.S. Cl. ................................. 395/575; 371/51.1; 395/425
[58] Field of Search ............... 395/575, 425; 371/10.1, 371/51.1

[56] References Cited

U.S. PATENT DOCUMENTS

| | | |
|---|---|---|
| 4,072,853 | 2/1978 | Barlow et al. |
| 4,157,586 | 6/1979 | Gannon et al. ............... 395/425 |
| 5,088,081 | 2/1992 | Farr ............................. 371/10.1 |
| 5,124,987 | 6/1992 | Milligan et al. ............. 371/10.1 |
| 5,140,592 | 8/1992 | Idleman et al. ............. 371/9.1 |
| 5,179,704 | 1/1993 | Jibbe et al. ................. 395/725 |
| 5,195,100 | 3/1993 | Katz et al. .................. 371/66 |

FOREIGN PATENT DOCUMENTS

| | | |
|---|---|---|
| 0249091 | 12/1987 | European Pat. Off. |
| 0369707 | 5/1990 | European Pat. Off. |

OTHER PUBLICATIONS

David A. Patterson, Peter Chen, Garth Gibson and Randy H. Katz, "Introduction to Redundant Arrays of Inexpensive Disks (RAID)"; IEEE 1989, pp. 112-117.
Spencer Ng; "Some Design Issues of Disk Arrays"; IEEE 1989, pp. 137-142.
David B. Anderson, Garrett A. Garrettson; "Disk Array Considerations"; Imprimis Technology Incorporated, pp. 1-10.
Parity Striping of Disc Arrays: Low-Cost Reliable Storage With Acceptable Throughput, 16th Int'l Conference on Very Large Data Bases, 1990, Australia, J. Gray, et al.

Primary Examiner—Robert W. Beausoliel, Jr.
Assistant Examiner—Albert Decady
Attorney, Agent, or Firm—Pravel, Hewitt, Kimball & Krieger

[57] ABSTRACT

A method and apparatus for improving disk performance during partial stripe write operations in a computer system having a disk array subsystem utilizing parity fault tolerance technique. When a partial stripe write generation is begun, the method determines if the area or stripe where the write is to occur is unused space in the file system. If not, the partial stripe write operation is performed using a preceding read operation to read the current data and parity information from the disk as would normally be done. However, if the write area is unused space in the file system, then the contents of the data stripe do not need to be preserved. In this instance, the partial stripe write operation can be performed without any preceding read operations. By obviating the necessity of a preceding read operation, much of the performance penalty of doing a partial stripe write in the case where the rest of the data stripe does not need to be preserved is removed.

13 Claims, 8 Drawing Sheets

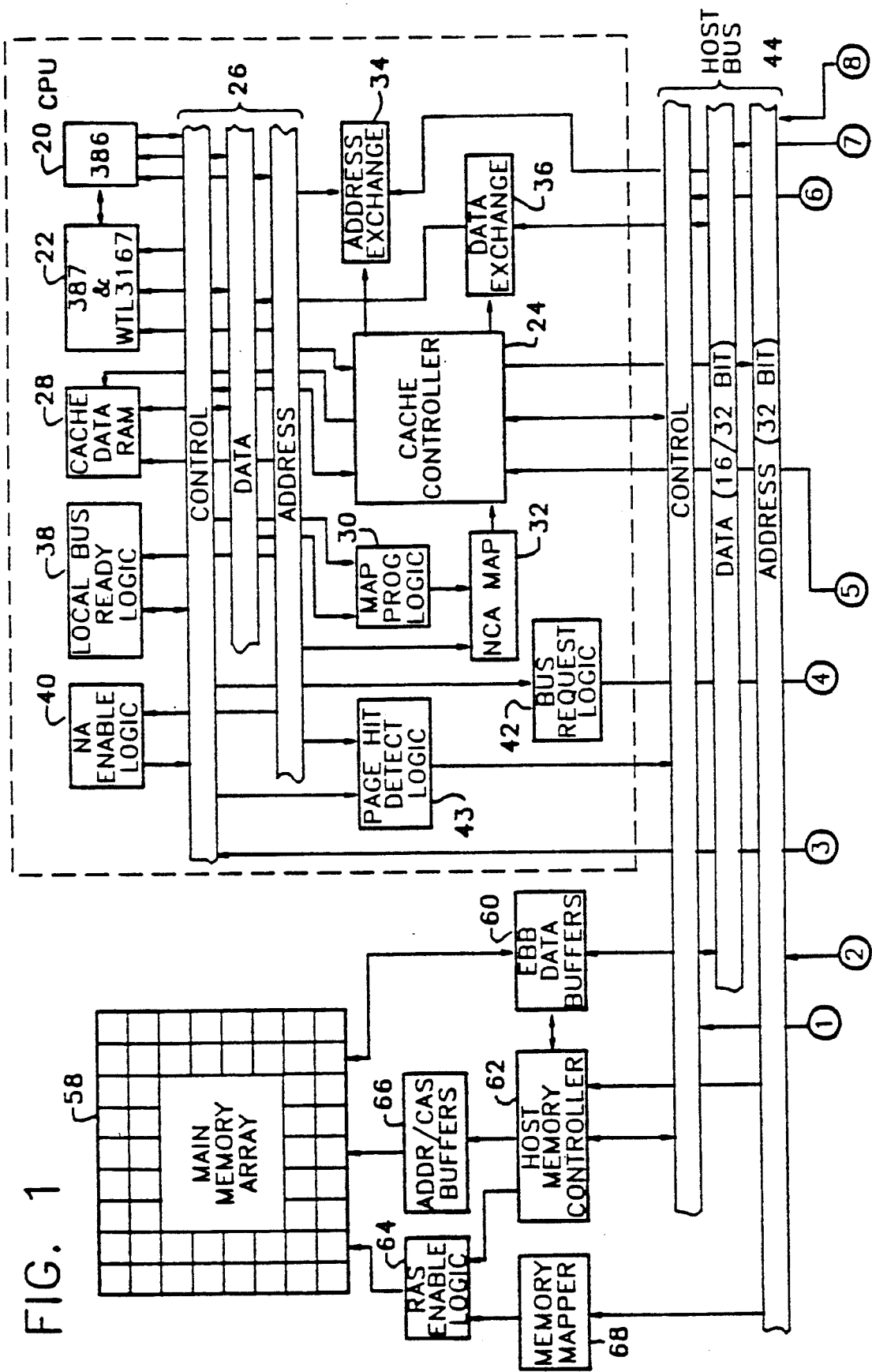

METHOD FOR IMPROVING PARTIAL STRIPE WRITE PERFORMANCE IN DISK ARRAY SUBSYSTEMS

BACKGROUND OF THE INVENTION

1. Field of the Invention

The present invention is directed toward a method for improving performance for multiple disk drives in computer systems, and more particularly to a method for performing write operations in a disk array utilizing parity data redundancy and recovery protection.

2. Description of the Related Art

Microprocessors and the computers which utilize them have become increasingly more powerful during the recent years. Currently available personal computers have capabilities in excess of the mainframe and minicomputers of ten years ago. Microprocessor data bus sizes of 32 bits are widely available whereas in the past 8 bits was conventional and 16 bits was common.

Personal computer systems have developed over the years and new uses are being discovered daily. The uses are varied and, as a result, have different requirements for various subsystems forming a complete computer system. With the increased performance of computer systems, it became apparent that mass storage subsystems, such as fixed disk drives, played an increasingly important role in the transfer of data to and from the computer system. In the past few years, a new trend in storage subsystems, referred to as a disk array subsystem, has emerged for improving data transfer performance, capacity and reliability. One reason for building a disk array subsystem is to create a logical device that has a very high data transfer rate. This may be accomplished by "ganging" multiple standard disk drives together and transferring data to or from these drives in parallel. Accordingly, data for a logical volume is stored "across" each of the disks comprising the disk array so that each disk holds a portion of the data comprising the volume. If n drives are ganged together, then the effective data transfer rate can be increased up to n times. This technique, known as striping, originated in the supercomputing environment where the transfer of large amounts of data to and from secondary storage is a frequent requirement. In striping, a sequential data block is broken into segments of a unit length, such as sector size, and sequential segments are written to sequential disk drives, not to sequential locations on a single disk drive. The unit length or amount of data that is stored 'across' each disk is referred to as the stripe size. If the data block is longer than n unit lengths, the process repeats for the next sector location on the disk drives. With this approach, the n physical drives become a single logical device. This may be implemented either through software or hardware.

One technique that is used to provide for data protection and recovery in disk array subsystems is referred to as a parity scheme. In a parity scheme, data blocks being written to various drives within the array are used and a known EXCLUSIVE-OR (XOR) technique is used to create parity information which is written to a reserved or parity drive within the array. The advantage to this technique is that it may be used to minimize the amount of data storage dedicated to data redundancy and recovery purposes within the array. However, there are a number of disadvantages to the use of parity fault tolerance techniques.

One major disadvantage is that traditional operating systems perform many small writes to the disk subsystem which are often smaller than the stripe size of the disk array, referred to as partial stripe write operations. When this occurs, the performance of the disk subsystem is seriously impacted because the data currently on the disk must be read off of the disk in order to generate the new parity information. This results in extra revolutions of the disk drive and causes delays in servicing the request. In addition to the time required to perform the actual operations, it will be appreciated that a READ operation followed by a WRITE operation to the same sector on a disk results in the loss of one disk revolution, or approximately 16.5 milliseconds for certain types of hard disk drives.

Thus, computer write operations often call for data stored on a disk to first be read, modified by the process active on the host system, and written back to the same address on the data disk. This operation consists of a data disk READ, modification of the data, and a data disk WRITE to the same address. Where an entire disk stripe is being written to the array, the parity information may be generated directly from the data being written to the drive array, and therefore no extra read of the disk stripe is required. However, a problem occurs when the computer writes only a partial stripe to a disk within the array because the array controller does not have sufficient information to compute parity for the entire stripe. There are generally two techniques used to compute parity information for partial stripe write operations. In the first technique, a partial stripe write to a data disk in an XOR parity fault tolerant system includes issuing a READ command in order to maintain the correct parity. The computer system first reads the parity information from the parity disk for the data disk sectors which are being updated and the old data values that are to be replaced from the data disk. The XOR parity information is then recalculated by the host or a local processor, or dedicated logic, by XORing the old data sectors to be replaced with the related parity sectors. This recovers the parity value without those data values. The new data values are XORed on to this recovered value to produce the new parity data. A WRITE command is then executed, writing the updated data to the data disks and the new parity information to the parity disk. It will be appreciated that this process requires two additional partial sector READ operations, one from the parity disk and one reading the old data, prior to the generation of the new XOR parity information. The new parity information and data are then written to locations which were just read. Consequently, data transfer performance suffers.

The second method requires reading the remainder of the data that is not to be repudiated for the stripe, despite the fact that it is not being replaced by the WRITE operation. Using the new data and the old data which has been retrieved, the new parity information may be determined for the entire stripe which is being updated. This process requires a READ operation of the data not to be replaced and a full stripe WRITE operation.

Therefore, partial stripe writes hurt system performance because either the remainder of the stripe that is not being written must be fetched or the existing parity information for the stripe must be read prior to the actual write of the information. Accordingly, there exists a need for an improved method for performing partial stripe disk WRITE operations in a parity fault tolerant disk array.

Background on file systems used in computer systems is deemed appropriate. Generally, a file system may use one of two techniques, either a "free list" or a bit map technique to describe the amount and location of free space on disk drive units. In a free list technique, a known location on the disk contains a pointer to a block, and in this block is a list of other free blocks, i.e. blocks on the disk that are unused by the file system. The very last pointer in this block points to a block with a list of other free blocks, thus forming a chain of blocks which contain information about free space in the file system. When a free list technique is used, it is difficult to determine if a respective block is free or unused because the entire free list must be traversed to determine if the block is free. In a bit map scheme, a portion of the disk includes a reserved area where one bit is allocated for every "allocation cluster," wherein an allocation cluster may include a number of allocated blocks. A respective bit is set when the corresponding cluster is free and is cleared when the corresponding cluster is not free. Therefore, in a bit map scheme one need only examine the respective bit associated with the desired cluster to determine if the cluster is free. Most operating systems including DOS, OS/2, Netware, and modern versions of UNIX use a bit map scheme. The classical or original UNIX operating system is an example of an operating system which uses a free list scheme.

SUMMARY OF THE INVENTION

The present invention is directed toward a method and apparatus for improving disk performance during partial stripe WRITE operations in a computer system having a disk array subsystem utilizing XOR parity fault tolerance and recovery techniques. When a partial stripe write operation is begun, the method according to the present invention determines if the portion of the respective stripe that will not be written during the partial stripe write comprises unused space in the file system. If not, the partial stripe write operation is performed using one of the techniques described in the background, wherein a preceding read operation is used to read the current data and parity information from the disk. However, if the portion of the respective stripe that will not be written during the partial stripe write comprises unused space in the file system, then the current contents of the data stripe do not need to be preserved. In this instance, the partial stripe write operation can be performed without any preceding READ operations. Optionally, null information or any other available data can be written over the remainder of the stripe not involved with the write. By obviating the necessity of a preceding READ operation, the performance penalty of doing a partial stripe write in the case where the rest of the data stripe does not need to be preserved is removed.

BRIEF DESCRIPTION OF THE DRAWINGS

A better understanding of the present invention can be obtained when the following detailed description of the preferred embodiment is considered in conjunction with the following drawings, in which:

FIGS. 1, 2A and 2B are block diagrams of an illustrative computer system on which the method of the present invention may be practiced;

DETAILED DESCRIPTION OF THE PREFERRED EMBODIMENT

The computer system and disk array subsystem described below represent the preferred embodiment of the present invention. It is also contemplated that other computer systems, not having the capabilities of the system described below, may be used to practice the present invention.

Figure 2A:
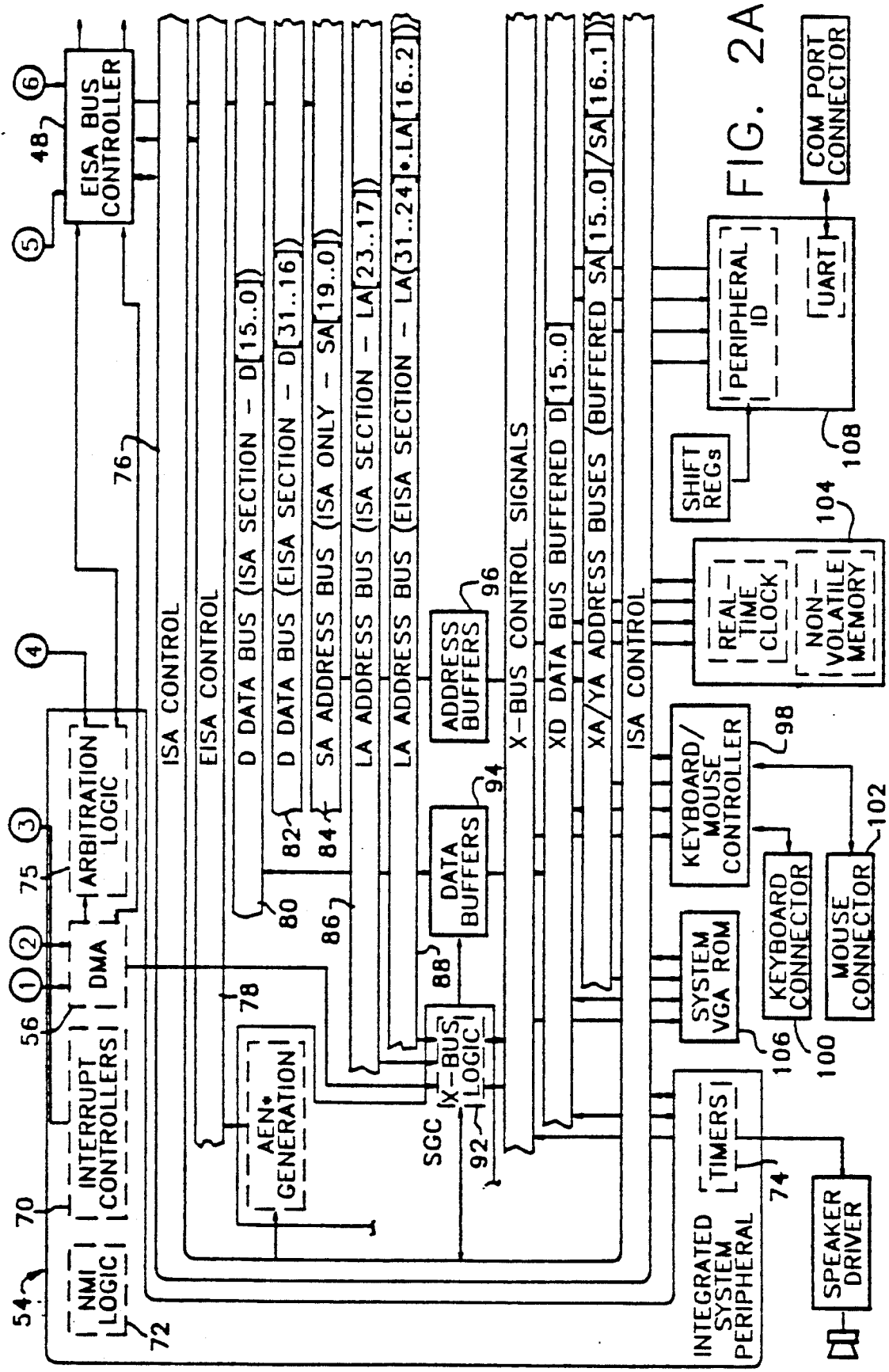
Figure 2B:
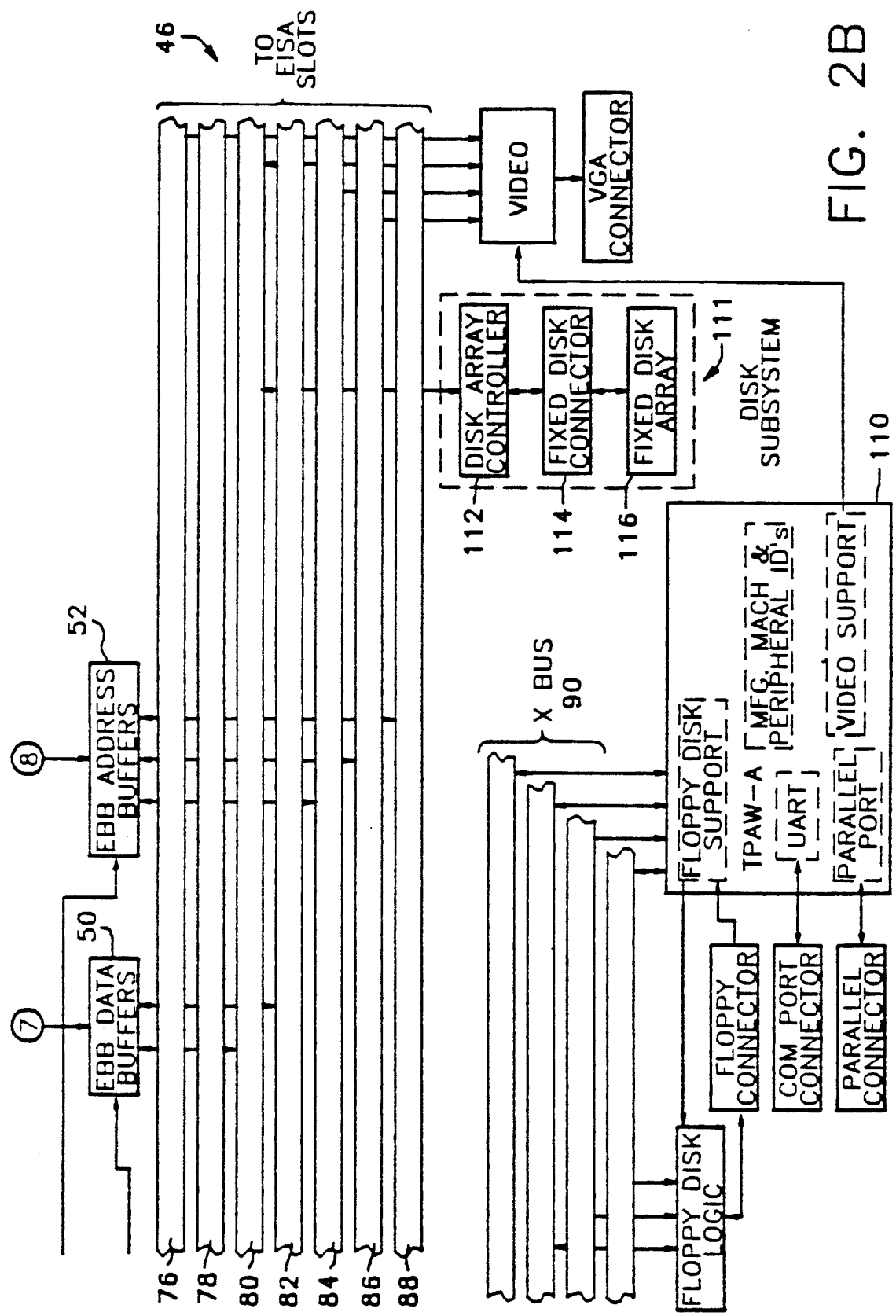

Referring now to FIGS. 1 and 2, the letter C generally designates a computer system on which the present invention may be practiced. For clarity, system C is shown in two portions with the interconnections between FIGS. 1 and 2 designated by reference to the circled numbers 1 to 8. System C is comprised of a number of block elements interconnected via 4 busses.

A central processing unit CPU comprises a system processor 20, a numerical co-processor 22, a cache memory controller 24, and associated logic circuits connected to a system processor bus 26. Associated with cache controller 24 is a high speed cache data random access memory (RAM) 28, non-cacheable memory address (NCA) map programming logic circuitry 30, non-cacheable address or NCA memory map 32, address exchange latch circuitry 34, data exchange transceiver 36 and page hit detect logic 43. Associated with the CPU also are system processor ready logic circuit 38, next address (NA) enable logic circuit 40 and bus request logic circuit 42.

The system processor is preferably an Intel Corporation 80386 microprocessor. The system processor 20 has its control, address and data lines interfaced to the system processor bus 26. The co-processor 22 is preferably an Intel 80387 and/or Weitek WTL3167 numerical processor interfacing with the local processor bus 26 and the system processor 20 in the conventional manner. The cache RAM 28 is preferably a suitable high-speed static random access memory which interfaces with the address and data elements of bus 26 under the control of the cache controller 24 to carry out required cache memory operations. The cache controller 24 is preferably an Intel 82385 cache controller configured to operate in two-way set associative master mode. In the preferred embodiment, the components are the 33 MHz versions of the respective units. An Intel 80486 microprocessor and an external cache memory system may replace the 80386, numeric coprocessor, 82385 and cache RAM if desired. Address latch circuitry 34 and data transceiver 36 interface the cache controller 24 with the processor 20 and provide a local bus interface between the processor bus 26 and a host or memory bus 44. Circuit 38 is a logic circuit which provides a bus ready signal to control access to the bus 26 and indicate when the next cycle may begin. The enable circuit 40 is utilized to indicate that the next address of data or code to be utilized by sub-system elements in pipelined address mode may be placed on the local bus 26.

Non-cacheable memory address (NCA) map programmer 30 cooperates with the processor 20 and the non-cacheable address memory 32 to map non-cacheable memory locations. The non-cacheable address memory 32 is utilized to designate areas of the system memory that are non-cacheable to avoid various types of cache coherency problems. The bus request logic circuit 42 is utilized by the processor 20 and associated elements to request access to the host bus 44 in situations such as when requested data is not located in cache memory 28 and access to system memory is required.

The main memory array or system memory 58 is coupled to the host bus 44. The main memory array 58 is preferably dynamic random access memory. Memory 58 interfaces with the host bus 44 via EISA bus buffer (EBB) data buffer circuit 60, a memory controller circuit 62, and a memory mapper 68. The buffer 60 performs data transceiving and parity generating and checking functions. The memory controller 62 and memory mapper 68 interface with the memory 58 via address multiplexor and column address strobe (ADDR/CAS) buffers 66 and row address strobe (RAS) enable logic circuit 64.

In the drawings, System C is configured as having the processor bus 26, the host bus 44, an extended industry standard architecture (EISA) bus 46 (FIG. 2) and an X bus 90 (FIG. 2). The details of the portions of the system illustrated in FIG. 2 and not discussed in detail below are not significant to the present invention other than to illustrate an example of a fully configured computer system. The portion of System C illustrated in FIG. 2 is essentially a configured EISA system which includes the necessary EISA bus 46 and EISA bus controller 48, data latches and transceivers referred to as EBB data buffers 50 and address latches and buffers 52 to interface between the EISA bus 46 and the host bus 44. Also illustrated in FIG. 2 is an integrated system peripheral (ISP) 54, which incorporates a number of the elements used in an EISA-based computer system.

The ISP 54 includes a direct memory access controller 56 for controlling access to main memory 58 (FIG. 1) or memory contained in an EISA slot and input/output (I/O) locations without the need for access to the processor 20. The ISP 54 also includes interrupt controllers 70, non-maskable interrupt logic 72, and system timer 74 which allow control of interrupt signals and generate necessary timing signals and wait states in a manner according to the EISA specification and conventional practice. In the preferred embodiment, processor generated interrupt requests are controlled via dual interrupt controller circuits emulating and extending conventional Intel 8259 interrupt controllers. The ISP 54 also includes bus arbitration logic 75 which, in cooperation with the bus controller 48, controls and arbitrates among the various requests for the EISA bus 46 by the cache controller 24, the DMA controller 56, and bus master devices located on the EISA bus 46.

The EISA bus 46 includes ISA and EISA control buses 76 and 78, ISA and EISA data busses 80 and 82, and are interfaced via the X bus 90 in combination with the ISA control bus 76 from the EISA bus 46. Control and data/address transfer for the X bus 90 are facilitated by X bus control logic 92, data buffers 94 and address buffers 96.

Attached to the X bus are various peripheral devices such as keyboard/mouse controller 98 which interfaces with the X bus 90 with a suitable keyboard and a mouse via connectors 100 and 102, respectively. Also attached to the X bus are read only memory (ROM) circuits 106 which contain basic operation software for the system C and for system video operations. A serial port communications port 108 is also connected to the system C via the X bus 90. Floppy disk support, a parallel port, a second serial port, and video support circuits are provided in block circuit 110.

The computer system C includes a disk subsystem 111 which includes a disk array controller 112, fixed disk connector 114, and fixed disk array 116. The disk array controller 112 is connected to the EISA bus 46, preferably in a slot, to provide for the communication of data and address information through the EISA bus 46. Fixed disk connector 114 is connected to the disk array controller 112 and is in turn connected to the fixed disk array 116. The computer system C preferably includes an operating system which uses a bit map scheme to represent free space in the file system. In this manner the disk controller 112 can easily determine if respective blocks are free or comprise unused space in the file system. In an alternate embodiment of the invention, an operating system which uses a free list scheme is used. In this embodiment, software in the disk array controller 112 preferably reads the entire free list and creates a bit map in memory that can be used to more easily determine if respective blocks are free or unused in the file system.

Figure 3:
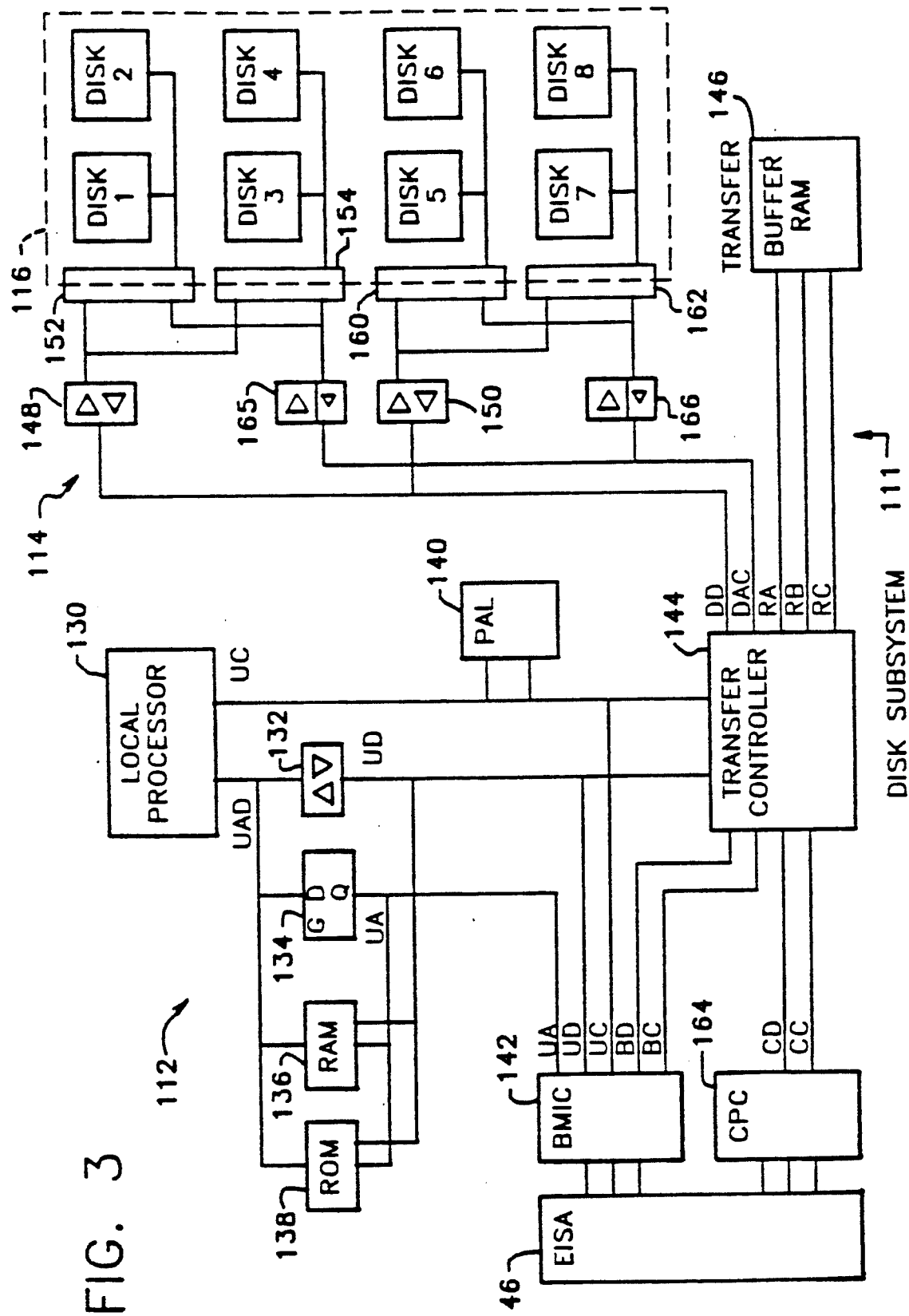
FIG. 3 is a block diagram of the disk subsystem of the preferred embodiment.

Referring now to FIG. 3, the disk subsystem 111 used to illustrate the method of the present invention is shown. The disk array controller 112 has a local processor 130, preferably an Intel 80186. The local processor 130 has a multiplexed address/data bus UAD and control outputs UC. The multiplexed address/data bus UAD is connected to a transceiver 132 whose output is the local processor data bus UD. The multiplexed address/data bus UAD is also connected to the D inputs of a latch 134 whose Q outputs form the local processor address bus UA. The local processor 130 has associated with it random access memory (RAM) 136 coupled via the multiplexed address/data bus UAD and the address data bus UA. The RAM 136 is connected to the processor control bus UC to develop proper timing signals. Similarly, read only memory (ROM) 138 is connected to the multiplexed address/data bus UAD, the processor address bus UA and the processor control bus UC. Thus, the local processor 130 has its own resident memory to control its operation and for its data storage. A programmable array logic (PAL) device 140 is connected to the local processor control bus UC to develop additional control signals utilized in the disk array controller 112.

The local processor address bus UA, the local processor data bus, UD and the local processor control bus UC are also connected to a bus master interface controller (BMIC) 142. The BMIC 142 serves the function of interfacing the disk array controller 112 with a standard bus, such as the EISA or MCA bus, and acts as a bus master. In the preferred embodiment, the BMIC 142 is interfaced with the EISA bus 46 and is the Intel 82355. Thus, by this connection with the local processor busses UA, UD and UC, the BMIC 142 can interface with the local processor 130 to allow data and control information to be passed between the host system C and the local processor 130.

Additionally, the local processor data bus UD and local processor control bus UC are preferably connected to a transfer controller 144. The transfer controller 144 is generally a specialized multi-channel direct memory access (DMA) controller used to transfer data between the transfer buffer RAM 146 and various other devices present in the disk array controller 112. For example, the transfer controller 144 is connected to the BMIC 142 by the BMIC data lines BD and the BMIC control lines BC. Thus, over this interface, the transfer controller 144 can transfer data from the transfer buffer RAM 146 to the BMIC 142 if a READ operation is requested. If a WRITE operation is requested, data can be transferred from the BMIC 142 to the transfer buffer RAM 146. The transfer controller 144 can then pass this information from the transfer buffer RAM 146 to disk array 116. The transfer controller 144 is described in greater detail in U.S. application Ser. No. 431,735, and in its European counterpart, European Patent Office Publication No. 0427119, published Apr. 4, 1991, which is hereby incorporated by reference.

The transfer controller 144 includes a disk data bus DD and a disk address bus and control bus DAC. The disk address and control bus DAC is connected to two buffers 165 and 166 which are part of the fixed disk connector 114 and are used to send and receive control signals between the transfer controller 144 and the disk array 116. The disk data bus DD is connected to two data transceivers 148 and 150 which are part of the fixed disk connector 114. The outputs of the transceiver 148 and the transfer buffer 146 are connected to two disk drive port connectors 152 and 154. In similar fashion, two connectors 160 and 162 are connected to the outputs of the transceiver 150 and the buffer 166. Two hard disks 156 and 158 can be connected to each connector 152, 154, 160, and 162. Thus, in the preferred embodiment, up to 8 disk drives can be connected and coupled to the transfer controller 144. In this way, the various data, address and control signals can pass between the transfer controller 144 and the respective disk drives.

In the illustrative disk array system 112, a compatibility port controller (CPC) 164 is also connected to the EISA bus 46. The CPC 164 is connected to the transfer controller 144 over the compatibility data lines CD and the compatibility control lines CC. The CPC 164 is provided so that the software which was written for previous computer systems which do not have a disk array controller 112 and its BMIC 142, which are addressed over an EISA specific space and allow very high throughputs, can operate without requiring a rewriting of the software. Thus, the CPC 164 emulates the various control ports previously utilized in interfacing with hard disks.

Figure 4:
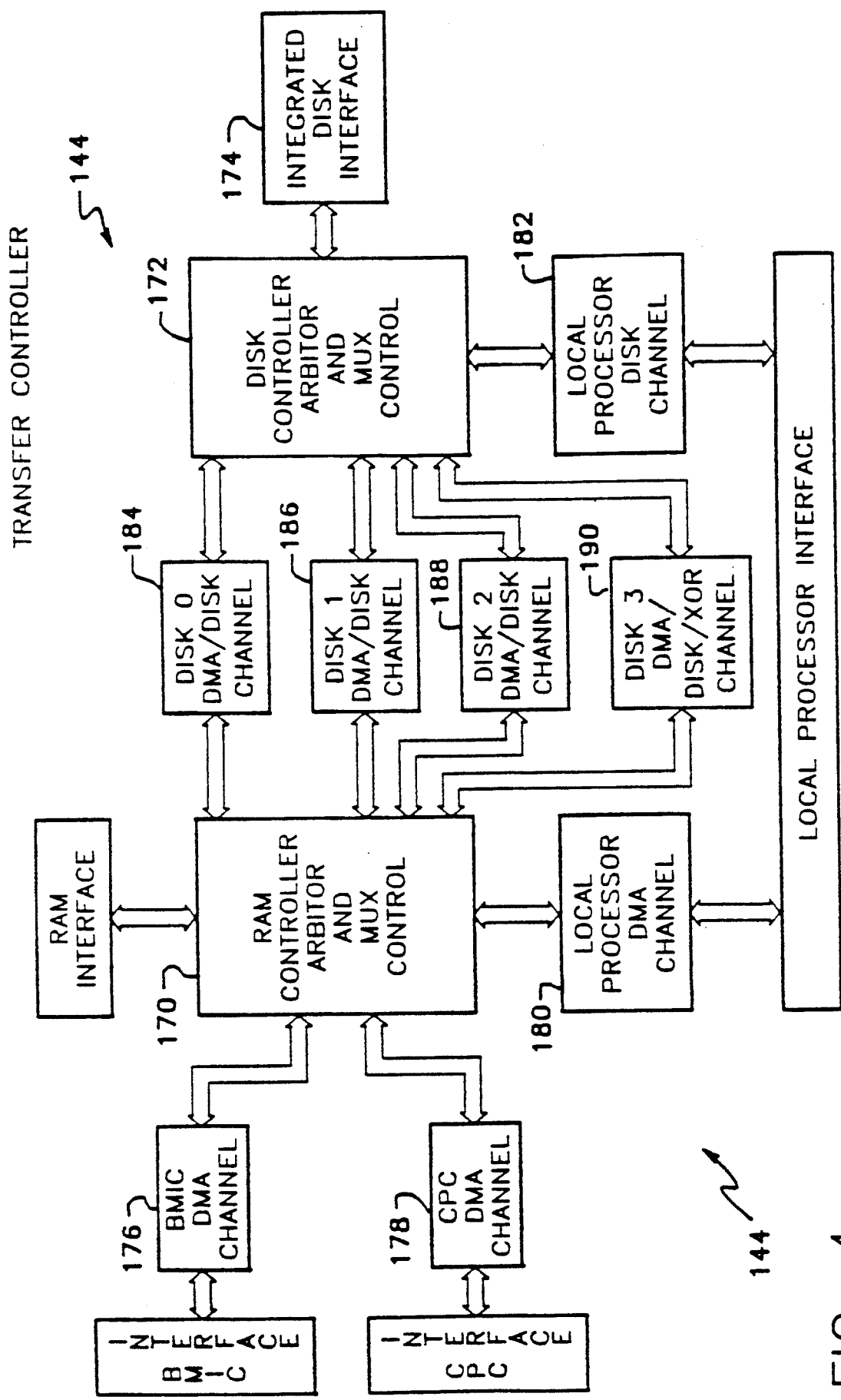
FIG. 4 is a functional block diagram of the transfer controller of FIG. 3 according to the preferred embodiment.

Referring now to FIG. 4, the transfer controller 144 is itself comprised of a series of separate circuitry blocks. The transfer controller 144 includes two main units referred to as the RAM controller 170 and the disk controller 172. The RAM controller 170 has an arbiter to control the various interface devices that have access to the transfer buffer RAM 146 and a multiplexor so that the data can be passed to and from the transfer buffer RAM 146. Likewise, the disk controller 172 includes an arbiter to determine which of the various devices has access to the integrated disk interface 174 and includes multiplexing capability to allow data to be properly transferred back and forth through the integrated disk interface 174.

The transfer controller 144 preferably includes 7 DMA channels. One DMA channel 176 is assigned to cooperate with the BMIC 142. A second DMA channel 178 is designed to cooperate with the CPC 164. These two devices, the BMIC 142 and the bus compatibility port controller 164, are coupled only to the transfer buffer RAM 146 through their appropriate DMA channels 176 and 178 and the RAM controller 170. The BMIC 142 and the compatibility port controller 164 do not have direct access to the integrated disk interface 174 and the disk array 116. The local processor 130 (FIG. 3) is connected to the RAM controller 170 through a local processor DMA channel 180 and is connected to the disk controller 172 through a local processor disk channel 182. Thus, the local processor 130 is connected to both the transfer buffer RAM 146 and the disk array 116 as desired.

Additionally, the transfer controller 144 includes 4 DMA disk channels 184, 186, 188 and 190 which allow information to be independently and simultaneously passed between the disk array A and the RAM 146. It is noted that the fourth DMA/disk channel 190 also includes XOR capability so that parity operations can be readily performed in the transfer controller 144 without requiring computations by the local processor 130. The above computer system C and disk array subsystem 111 represent the preferred computer system for the practice of the method of the present invention.

Referring again to FIG. 3, in the preferred embodiment, a disk request is preferably submitted by the system processor 20 to the disk array controller 112 through the EISA bus 46 and BMIC 142. The local processor 130, on receiving this request through the BMIC 142, builds a data structure in the local processor RAM memory 136. This data structure is known as a command list and may be a simple READ or WRITE request directed to the disk array, or it may be a more elaborate set of requests containing multiple READ/WRITE or diagnostic and configuration requests. The command list is then submitted to the local processor 130 for processing. The local processor 130 then oversees the execution of the command list, including the transferring of data. Once the execution of the command list is completed, the local processor 130 notifies the operating system device driver running on the system microprocessor 20. The submission of the command list and the notification of the command list completion are achieved by a protocol which uses input/output (I/O) registers located in the BMIC 142.

The READ and WRITE operations executed by the disk array controller 112 are implemented as a number of application tasks running on the local processor 130. Because of the nature of the interactive input/output operations, it is impractical for the illustrative computer system C to process disk commands as single batch tasks on the local processor 130. Accordingly, the local processor 130 utilizes a real time multi-tasking use system which permits multiple tasks to be addressed by the local processor 130, including the method of the present invention. Preferably, the operating system on the local processor 130 is the AMX86 multi-tasking executive by Kadak Products, Ltd. The AMX operating system kernel provides a number of system services in addition to the applications set forth in the method of the present invention.

Figure 5:
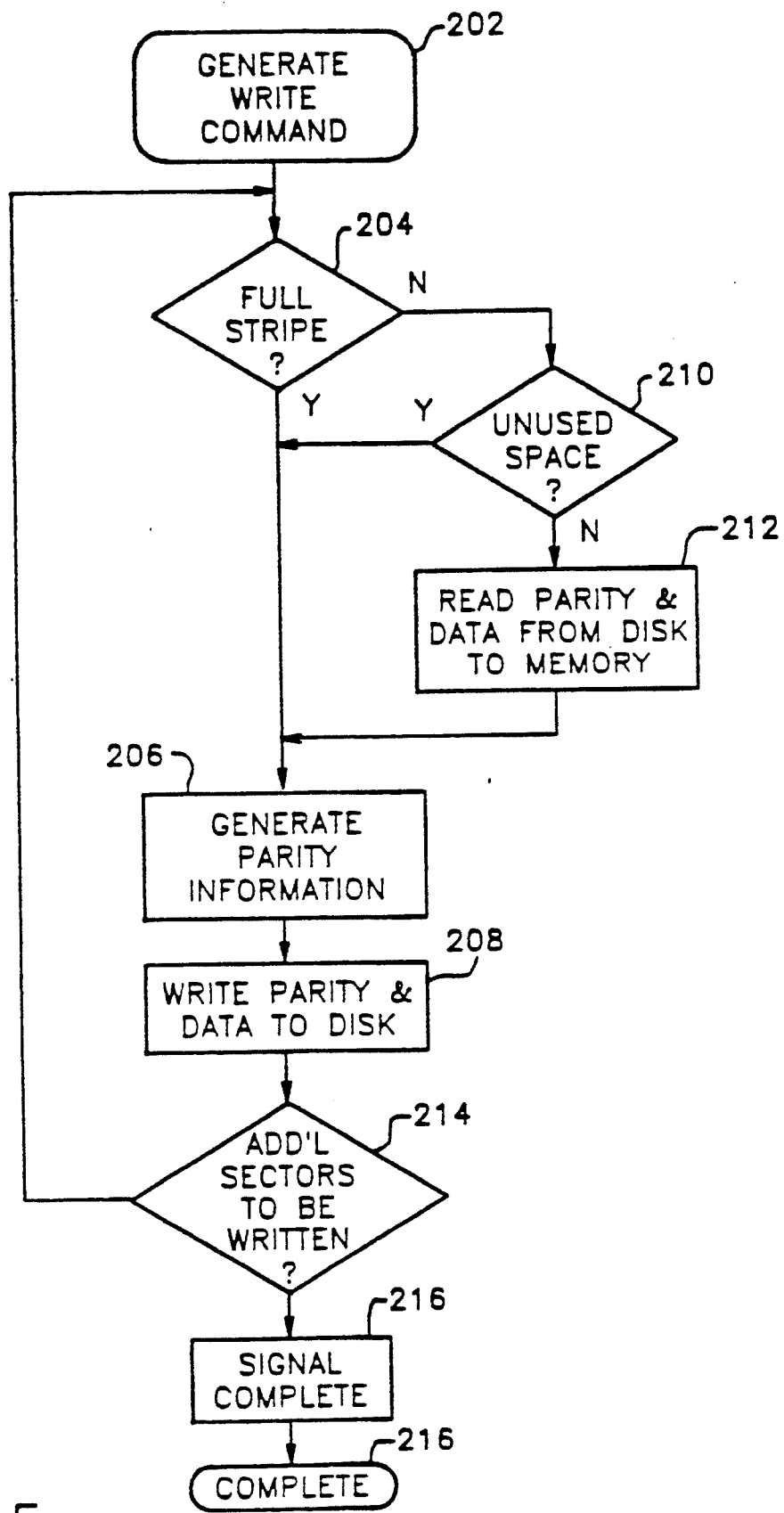
FIG. 5 is a flowchart diagram of a WRITE operation in the method of the present invention when the disk array controller of FIG. 3 is not utilized.

Operation of the Invention in a Computer System Without an Intelligent Disk Array Controller FIG. 5 depicts a WRITE operation using the method of the present invention on a generic computer having three or more disk drives utilizing XOR parity fault tolerant techniques. The system contemplated in FIG. 5 is not of the type described in FIGS. 1–4 and does not include an intelligent disk array controller 112, but rather the method depicted in FIG. 5 is for a computer system in which the device driver utilizes the system processor 20 to perform all disk READ and WRITE operations, including XOR operations. Therefore, FIG. 5 is a flowchart diagram of the method of performing a WRITE operation according to the present invention for a generic computer not having an intelligent disk array controller 112.

In step 202, the system processor 20 is executing an application program and generates a WRITE command to the disk device driver. The disk device driver is a portion of the software contained within the computer system C, preferably the system memory 58, which performs the actual interface operations with the disk units. The disk device driver software assumes control of the system processor 20 to perform specific tasks to carry out the required I/O operations. Control transfers to step 204, wherein the device driver determines whether at least a full stripe is being written to the disk array 116. It will be appreciated that the write command may specify a partial data stripe, a full data stripe, or a full data stripe plus a partial data stripe written to the disk array 116. If in step 204 the device driver determines that at least one full data stripe is being written to the array 116, control transfers to step 206. In step 206 the device driver causes the processor 20 to generate the parity information for the first full data stripe WRITE operation. If the operation includes a full stripe write, the parity data need not be obtained from the respective disk because the parity information can be readily obtained from the data. Control then transfers to step 208, wherein the processor 20 writes the parity information and the data to the disks. Control thereafter transfers to step 214, where the device driver determines if additional sectors need to be written. If so, control returns to step 204.

If in step 204 the device driver determines that a full stripe of data is not being written to the disk array 116 but rather a partial data stripe is being written, control transfers to step 210. In step 210, the device driver determines whether the portion of the stripe that will not be written with data during the partial stripe write operation comprises unused space. In the preferred embodiment, the device driver checks the bit map for the respective portions on each of the disks comprising the stripe to determine if the respective blocks of sectors in the stripe that will not be written with data in the upcoming partial stripe write operation comprise unused space. If the portion of the stripe that will not be written with data comprises unused space, then there is no need to read old parity information or data from the stripe, and control transfers to step 206. In step 206, the device driver generates the parity information for the data stripe and then writes the parity information and data to the respective disk in step 208. During the write operation in step 208, the device driver preferably writes dummy data to the portion of the stripe that is not written with partial stripe write data, hereafter referred to as valid data. The device driver preferably uses the dummy data in conjunction with the valid data in computing parity. Alternatively, the device driver computes parity information solely from the valid data resulting from the partial stripe write operation, and no dummy data is written. Note, however, that in this alternative some memory would be required to record which disks were involved in the parity calculation for each stripe so that, in case of a disk failure, the data could be properly reconstructed. Control then transfers to step 214.

Thus, if the entire stripe where the partial stripe write is to occur comprises unused space prior to the partial stripe write, then parity information can be computed without any disk read operations. Similarly, if the stripe where the write is to occur includes a portion containing data and an unused portion prior to the write, and the upcoming partial stripe write operation will overwrite the portion of the stripe containing data such that after the write operation is performed the unwritten portion of the stripe is unused or contains dummy data, then no disk read operations are required. In these instances, the write operation requires much less time to complete.

In an alternate embodiment of the invention, the device driver only determines if the entire stripe comprises unused space in step 210 before branching to either steps 212 or 206. In this embodiment, a preceding READ operation is required before a partial stripe write operation is performed if any portion of the stripe comprises used space, even if this area will be overwritten by the write operation.

If the device driver determines in step 210 that some portion of the stripe that will not be written with valid data during the partial stripe write operation currently contains data, then control transfers to step 212. In step 212, the device driver causes the system processor 20 to generate disk specific READ commands which read the associated parity information and old data from the parity and data disks, respectively, and place this information into temporary buffers in memory 58. Control then transfers to step 206 where the system processor 20 uses the new or valid data, the old data and the old parity information from the write buffer area and memory area to generate the new XOR parity information. It is noted that either of the techniques described in the background may be used. The old data and parity information are read from temporary buffers in memory 58. Control of the system processor 20 then transfers to step 208, wherein the device driver causes the system processor 20 to write the new data and new parity information to their respective disks. Control then transfers to step 214, wherein the device driver determines whether there are additional data sectors to be written to disk. If additional sectors are to be written, control returns to step 204. If no additional sectors are to be written, control transfers to step 216 wherein the device driver signals complete. Control then transfers to step 218 which terminates the WRITE operation, and the device driver frees the system processor 20 to resume execution of the application program.

Figure 6A:
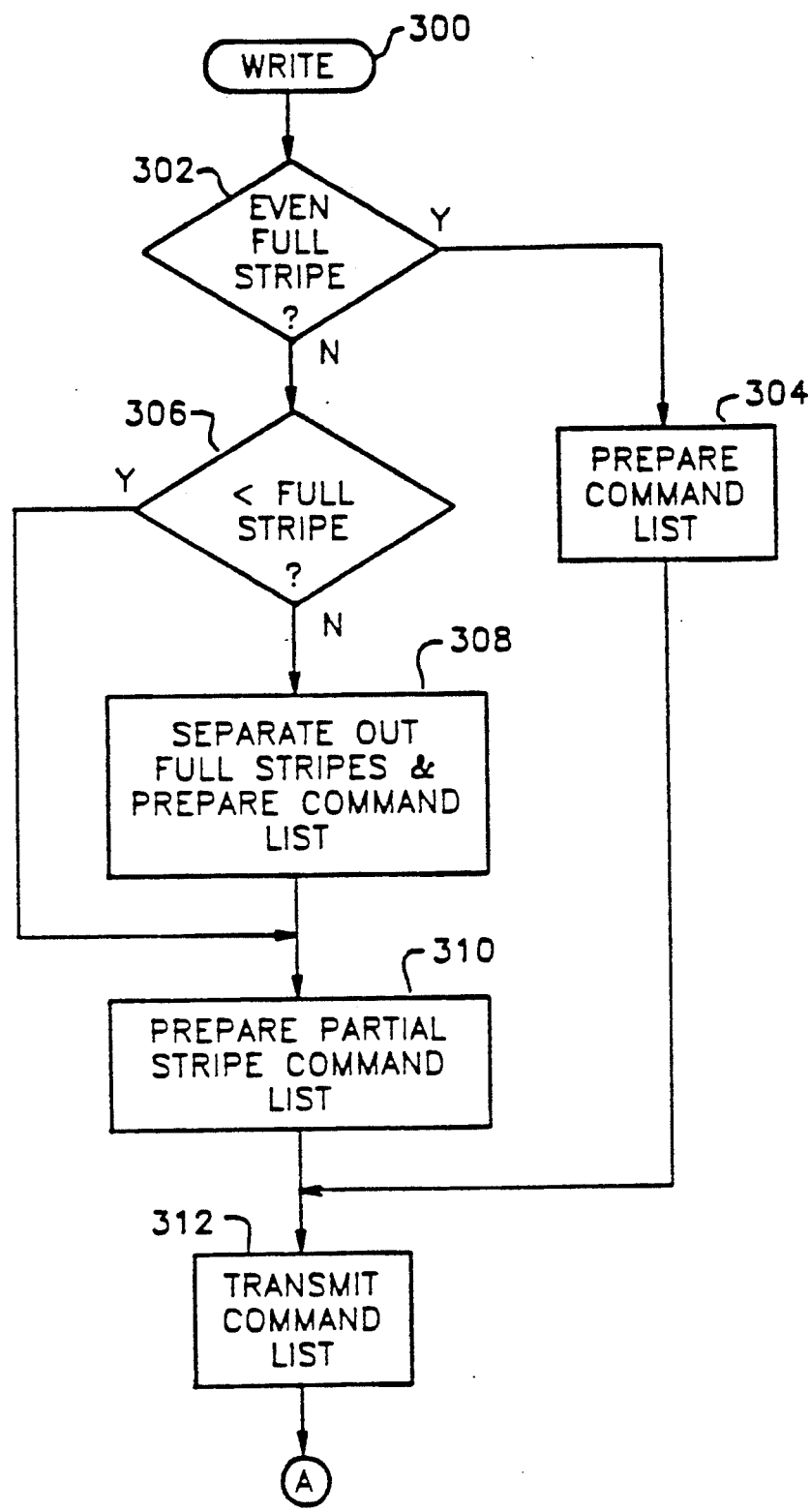
FIGS. 6A and 6B are flowchart diagrams of a WRITE operation in the method of the present invention when utilizing the disk array controller of FIG. 3.
Figure 6B:
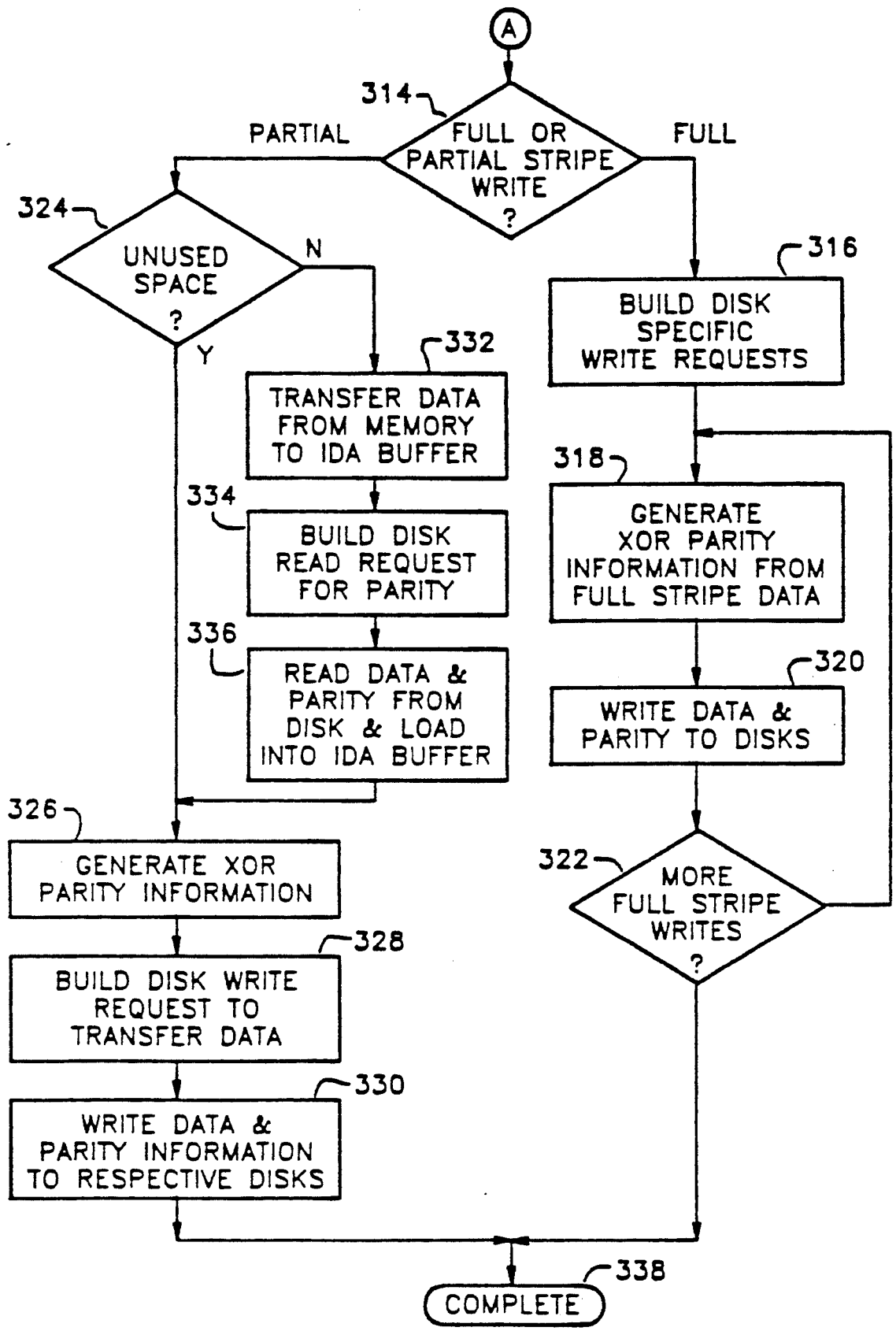

Operation of the Invention in a Computer System With an Intelligent Disk Array Controller Referring now to FIGS. 6A and 6B, a flowchart diagram of a WRITE operation as carried out on a computer system C including the intelligent disk array controller 112 is shown. The flowchart is shown in two portions for clarity, and the interconnection between FIGS. 6A and 6B is shown by reference to the circled letter A. The WRITE operation begins at step 300, where the active process or application causes the system processor 20 to generate a WRITE request which is passed to the disk device driver. When this occurs, the disk device driver assumes control of the system processor 20 in order to generate a WRITE command list.

In step 302, the device driver determines whether the WRITE command calls for an even full data stripe to be written to the disk array 116. In the preferred embodiment, it is contemplated that the device driver creates separate command lists for full stripe writes and partial stripe writes. If the write operation involves an even full stripe write, that is, an integral number of full stripe writes, then the device driver prepares the command list in step 304 and then transmits the command list in step 312. If the write operation does not involve an even full stripe write, which is the more usual case, the device driver determines if less than a full stripe is being written in step 306. If greater than a full stripe is being written, then in step 308 the device driver separates out the full stripe write operation(s) and prepares a command list for these operations. In step 310 the device driver prepares a command list for the remaining partial stripe write operation. If in step 306 the device driver determines that less than a full stripe is being written, the device driver proceeds directly to step 310 where it creates the command list for the partial stripe write operation. The device driver then advances from step 310 to step 312 where it transmits the command list(s) to the disk controller 112 via the BMIC 142. The device driver then goes into a wait state to await a completion signal from the disk array controller 112. Thus, the device driver according to the preferred embodiment creates separate command lists for full stripe and partial stripe writes. In an alternate embodiment of the invention, the device driver provides WRITE commands to the disk controller 112 without differentiating between full and partial stripe writes. In this embodiment, the disk array controller 112 determines whether the operation is a full or partial stripe write when the WRITE command list is received.

In step 314, the disk controller 112, having received the command list(s) from the device driver, determines whether the respective command list on which it is operating is a full stripe or partial stripe write operation. If the write operation is a full stripe write, then logical flow of the operations proceeds to step 316, wherein the local processor 130 builds disk specific WRITE commands for the full stripe WRITE operation. Control then transfers to step 318, wherein the transfer controller chip (TCC) 144 generates parity data from the full stripe of data being written to the disk array 116. Control of the operations then transfers to step 320, wherein the TCC 144 writes the data and the newly generated parity to disks within disk array 116. Control thereafter transfers to step 322, wherein the local processor 130 determines whether additional full stripes are to be written to the disk array 116. If additional full stripes are to be written to the disk array 116, control returns to step 318 and steps 318-322 are repeated. If no additional full stripes are to be written to the disk array 116, then the current command list is completed, as shown in step 338, with a completion indication being given to the device driver to potentially release it from the wait state to allow operations to proceed.

If the disk controller 112 determines that the respective command list on which it is operating involves a partial stripe write in step 314, then control transfers to step 324. In step 324, the disk controller 112 determines whether the portion of the stripe that will not be written with valid data during the partial stripe write operation comprises unused space. In the preferred embodiment, the disk controller 112 checks the bit map for the respective portions on each of the disks comprising the stripe in step 324 to determine if the respective blocks or sectors in the stripe that will not be written in the upcoming partial stripe write operation comprise unused space. If the portion of the stripe that will be unwritten during the partial stripe write operation comprises unused space, then there is no need to read old parity information or data from the stripe, and control transfers to step 326. In step 326, the TCC 144 generates parity information for the valid data being written. In step 328, the disk array controller 112 builds disk specific write commands to transfer the data to the disk array 116 based on the WRITE command list submitted by the device driver. In step 330, the TCC 144 writes the data and parity information to the disks. The execution of the command list then completes in step 338.

The disk controller 112 preferably writes dummy data to the portion of the stripe that is not written with valid data during the partial stripe write operation, and the TCC 144 preferably uses the dummy data in conjunction with the partial stripe write data in computing parity. Alternatively, the TCC 144 computes parity information solely from the valid data written during the partial stripe write operation, which is similar to the manner in which parity information is generated during full stripe write operations, and no dummy data is written. In those instances, regeneration of data would be done without using the values present in the unused block, but only using the used blocks and the parity value. As previously noted, in this alternate scheme, memory in the disk controller 112 would preferably be set aside to record which blocks and which disks were involved in the parity calculation for each stripe.

Thus, if the entire stripe where the partial stripe write is to occur comprises unused space, then parity information can be computed without any disk read operations. Similarly, if the stripe where the write is to occur includes a portion containing data and an unused portion, and the upcoming partial stripe write operation will overwrite the portion of the stripe containing data such that the unwritten portion of the stripe after the write operation is performed is unused or contains dummy data, then no disk read operations are required. In these instances, the write operation requires much less time to complete.

In an alternate embodiment of the invention, the disk controller 112 only determines if the entire stripe comprises unused space in step 324 before branching to either steps 332 or 326. In this embodiment, a preceding READ operation is required before the partial stripe write operation is performed if any portion of the stripe to be written comprises used space, even if this area will be overwritten by the partial stripe write operation.

If the disk controller 112 determines in step 324 that some portion of the stripe that will not be written with valid data during the partial stripe write operation currently contains valid data, then control transfers to step 332. In step 332, the local processor 130 queues the WRITE command from the device driver and the BMIC 142 executes the transfer of data from memory to the transfer controller buffer RAM 146. Control transfers to step 334, wherein the local processor 130 builds disk READ requests for the old data and the old parity information corresponding to the data sectors which will not be overwritten. The READ requests are queued and acted upon by the local processor 130. Control then transfers to step 336 where the READ requests are performed. The old parity information and old data are read from their respective disks and loaded into the transfer buffer 146 via the TCC 144.

Control then transfers to step 326, and new parity information for the partial stripe write operation is generated according to previously described techniques using the new data, old data, and old parity information. The TCC 144 preferably accesses the new data as well as the old parity information and old data stored in transfer buffer RAM 146 and utilizes the dedicated XOR DMA parity channel to generate the new XOR parity information. This dedicated parity capability permits the preferred embodiment to perform parity operations without requiring computations by the local processor 130. Control then transfers to step 328, wherein the local processor 130 builds disk WRITE commands to transfer the data to the disk array 116. Control then transfers to step 330, and the TCC 144 writes the new data and new parity information to their respective disks through DMA subchannels 184-190. Thus, if the area or stripe where the partial stripe write is occurring currently contains valid data which will not be overwritten, then three extra steps, step 332, 334 and 336 are required to complete the write operation. These three additional steps are the performance penalty associated with partial stripe write operations where the area to be written currently contains data. The execution of the command list then completes in step 338.

It will be appreciated that WRITE command lists for full stripe and partial stripe writes of data may be executed virtually simultaneously as a result of the multitasking environment used within the disk array controller 112. Therefore, upon completion of a command list in step 338, it is noted that other command lists may be concurrently executing in the disk controller 112 in steps 314-338. When the command list of a respective WRITE operation has completed, then the disk controller 112 signals WRITE complete to the disk device driver. The device driver then releases control of the system processor 20 to continue execution of the application program.

Therefore, it is noted that no preceding READ operations are required on a partial stripe write operation if the portion of the stripe that is not written with valid data comprises unused space. The old data and old parity information do not have to be read from the disk drives in this instance, only the new data and parity need be written to the disk drives. Dummy data may also be written to the respective stripe, if desired. Thus, operations are improved on partial stripe WRITE operations where the portion of the stripe that is not written with valid data is determined to comprise unused space in the file system.

The foregoing disclosure and description of the invention are illustrative and explanatory thereof, and various changes in the components, and methods as well as in the details of the illustrated logic and flowcharts may be made without departing from the spirit of the invention.

I claim:

1. A method for performing disk array write operations in a computer system disk array having a plurality of disk units each having a plurality of stripes for storing data and parity information, wherein the disk array utilizes parity fault tolerance techniques, the method comprising:

generating a data write operation to write valid data to a data stripe portion in the disk array;

determining if said write operation is a partial stripe write operation, wherein said partial stripe write operation includes writing said valid data to only a first portion of said data stripe portion;

determining if a second portion of said data stripe portion other than said first portion comprises unused space if said write operation is a partial stripe write operation;

generating parity information for said data stripe portion using only said valid data if said second portion comprises unused space; and writing said valid data to said first portion and said parity information to said parity information portion of said stripe after generating said parity information.

2. The method of claim 1, further comprising:

generating parity information for said data stripe portion using dummy data and said valid data if said write operation is a partial stripe write operation and said second portion comprises unused space; and writing said dummy data to said second portion of said data stripe portion during said step of valid data and parity information writing.

3. The method of claims 1 or 2, further comprising:

generating parity information for said data stripe portion using only said valid data if said write operation is a full stripe write operation;

writing said valid data and said parity information to said stripe after generating said parity information for said full stripe write operation.

4. The method of claims 1 or 2, further comprising:

reading old data from said second portion of said data stripe portion after said step of unused space determining if said write operation is a partial stripe write operation and said second portion comprises used space;

generating second parity information for said data stripe portion using said valid data and said old data; and writing said valid data and said second parity information to said stripe after generating said second parity information.

5. The method of claims 1 or 2, further comprising:

reading old data from said second portion and old parity information from said parity information portion after said step of unused space determining if said write operation is a partial stripe write operation and said second portion comprises used space;

generating second parity information for said data stripe portion using said valid data, said old data, and said old parity information; and writing said valid data and said second parity information to said stripe after generating said parity information.

6. The method of claims 1 or 2, wherein said step of partial stripe write determining is performed by a system processor in the computer system.

7. The method of claims 1 or 2, wherein said step of partial stripe write determining is performed by a local processor coupled to the disk array.

8. The method of claim 1, wherein said step of generating said data write operation includes generating separate write command lists for full stripe write operations and partial stripe write operations; and wherein said step of write operation determining includes determining if a received write command list is a full stripe write operation or a partial stripe write operation.

9. A computer system which performs disk array write operations, comprising:
- a system bus;
- a disk array coupled to said system bus having a plurality of disk units each having a plurality of stripes for storing data and parity information;
- means coupled to said system bus for generating a data write operation to write valid data to a data stripe portion in said disk array;
- means coupled to said write generating means for determining if said write operation is a partial stripe write operation, wherein said partial stripe write operation includes writing said valid data only to a only first portion of said data stripe portion;
- means coupled to said partial stripe write determining means and said disk array for determining if a second portion of said data stripe portion comprises unused space if said write operation is a partial stripe write operation;
- means coupled to said unused space determining means and said system bus receiving said data for generating parity information for said data stripe portion using only said valid data if said second portion comprises unused space; and
- means coupled to said parity information generating means, said system bus, and said disk array for writing said valid data to said first portion and said parity information to said parity information portion of said stripe.

10. The computer system of claim 9, wherein said parity information generating means generates parity information for said data stripe portion using dummy data and said valid data if said second portion comprises unused space; and
wherein said writing means writes said dummy data to said second portion of said data stripe portion when said valid data and said parity information are written to said stripe.

11. The computer system of claims 9 or 10, wherein said parity information generating means is also coupled to said partial stripe write determining means and operates if said write operation is a full stripe write operation.

12. The computer system of claims 9 or 10, further comprising:
- means coupled to said disk array, said unused space determining means, and said partial stripe write determining means for reading old data from said second portion of said data stripe portion if said write operation is a partial stripe write operation and said second portion comprises used space;
- means coupled to said old data reading means and said system bus receiving said data for generating second parity information for said data using said valid data and said old data; and
- means coupled to said second parity information generating means, said system bus, and said disk array for writing said valid data and said second parity information to said stripe.

13. The computer system of claims 9 or 10, further comprising:
- means coupled to said disk array, said unused space determining means, and said partial stripe write determining means for reading old data and old parity information from said stripe if said write operation is a partial stripe write operation and said second portion comprises used space;
- means coupled to said reading means and said write operation generating means receiving said valid data for generating second parity information for said data stripe portion using said valid data, said old data, and said old parity information; and
- means coupled to said second parity generating means and said disk array for writing said valid data and said second parity information to said stripe.

* * * * *